United States Patent [19]

Hinchey et al.

[11] 4,348,369

[45] Sep. 7, 1982

[54] ZEOLITE LZ-200

[75] Inventors: Richard J. Hinchey, Thornwood; Willis W. Weber, South Salem, both of N.Y.

[73] Assignee: Union Carbide Corporation, Danbury, Conn.

[21] Appl. No.: 280,377

[22] Filed: Jul. 6, 1981

[51] Int. Cl.³ .............................................. C01B 33/28
[52] U.S. Cl. ................................ 423/328; 252/455 Z; 423/329
[58] Field of Search ............................ 423/328–330; 252/455 Z

[56] References Cited

U.S. PATENT DOCUMENTS

| | | | |
|---|---|---|---|
| 2,882,243 | 4/1959 | Milton | 423/329 |
| 2,991,151 | 7/1961 | Breck et al. | 423/328 |
| 3,058,805 | 10/1962 | Weber | 423/329 |
| 3,071,434 | 1/1963 | Frilette et al. | 423/329 |
| 3,130,007 | 4/1964 | Breck | 423/329 |
| 3,314,752 | 4/1967 | Kerr | 423/328 |
| 3,338,672 | 8/1967 | Haden et al. | 423/329 |
| 3,546,137 | 12/1970 | Gladrow et al. | 423/329 |
| 3,567,372 | 3/1971 | Duecker et al. | 423/329 |
| 3,597,169 | 8/1971 | Savage | 423/329 |
| 3,720,756 | 3/1973 | Schwochow et al. | 423/329 |
| 4,075,280 | 2/1978 | Fitton et al. | 423/329 |
| 4,235,856 | 11/1980 | Kostinko | 423/329 |

FOREIGN PATENT DOCUMENTS 626000  8/1961  Canada .
927658  5/1963  United Kingdom .

Primary Examiner—Edward J. Meros
Attorney, Agent, or Firm—James L. Sonntag

[57] ABSTRACT

Crystalline synthetic zeolite, denoted "LZ-200", has an anhydrous composition in terms of mole-ratios of oxides of:

0.9–1.1 $Na_2O$: $Al_2O_3$:1.9–2.4 $SiO_2$, while having a pore diameter somewhat smaller than that of potassium zeolite A, and is useful as an adsorbent and ion-exchanger.

2 Claims, No Drawings

ZEOLITE LZ-200

BACKGROUND OF THE INVENTION

1. Field of the Invention

The invention relates to a novel synthetic crystalline zeolite of the molecular sieve type, hereinafter denoted "LZ-200".

2. Description of the Prior Art

For many years, naturally-occurring hydrated aluminosilicates called zeolites have been investigated and a great deal of technical literature has been generated. Zeolites exhibit ion-exchange and molecular sieve properties that are useful in many engineering applications. This has prompted researchers to develop zeolites synthetically from silica- and alumina-containing raw materials.

While many synthetic zeolites have natural counterparts, others have unique crystal structures that have no counterpart in nature. Among the earliest of such zeolites found are zeolites A and X as disclosed by R. M. Milton in U.S. Pat. Nos. 2,882,243 and 2,882,244, respectively. Since the development of the first synthetic zeolites, more new synthetic zeolites have been made.

SUMMARY OF THE INVENTION

The present invention relates to a novel crystalline synthetic zeolite, denoted LZ-200. LZ-200 can be identified and distinguished by its X-ray powder diffraction pattern and its composition, which in terms of mole-ratios of the oxides on an anhydrous basis, is as follows:

$$0.9-1.1 M_{2/n}O : Al_2O_3 : 1.9-2.4\ SiO_2,$$

wherein M is selected from the group including the alkali metals, alkaline earth metals, transition metals, ammonium and hydrogen, and n is the valence of M. In its preferred as-synthesized form M is a sodium ion.

LZ-200 has a unique crystal structure that can be distinguished by its characteristic X-ray powder diffraction pattern. In Table A are shown d-spacings of the X-ray diffraction pattern that characterize the sodium form of LZ-200. Under moderate conditions for conducting ion-exchange with most other cations for the sodium cation, and/or when variant crystal forms of LZ-200 are synthesized, the X-ray diffraction pattern will still be the characteristic pattern, i.e., containing at least those d-spacings shown in Table A with minor shifts in d-spacings and minor variations in relative intensities.

The values in Table A were determined by standard techniques. The radiation was the K-alpha doublet of copper and a counter-spectrometer with a strip-chart pen recorder was used. The peak heights or intensities, I, and the positions of the peaks as a function of 2 times theta, 2θ, where θ is the Bragg angle, were read from the spectrometer chart. From these the relative intensities, 100 $I/I_o$, where $I_o$ is the intensity of the strongest peak, and the interplaner spacings in Angstrom units, d, corresponding to the recorded lines, were calculated. In Table A the relative intensities are given as "VS", very strong; "S", strong; and "M", medium.

TABLE A

| Interplanar spacings, d, Å | Relative Intensities |
|---|---|
| 12.1 ± 0.2 | VS |
| 6.99 ± 0.10 | M |
| 4.75 ± 0.07 | M |
| 4.57 ± 0.07 | M |
| 4.42 ± 0.07 | M |
| 3.49 ± 0.05 | M |
| 3.03 ± 0.05 | S |
| 2.89 ± 0.05 | M |
| 2.81 ± 0.05 | M |
| 2.64 ± 0.05 | M |

LZ-200 exhibits ion-exchange properties. The original cations can be replaced by techniques well known in the art, using suitable salts or acids. Cations suitable for exchange comprise the alkali, alkaline earth, and transition metals, ammonium, and hydrogen. Ion-exchange with some cations under severe conditions, however, may cause LZ-200 to undergo a crystal alteration. For example, when sodium LZ-200 was exchanged with a 10% NH₄Cl solution (six fold excess NH₄+) under reflux conditions, a product exhibiting a somewhat altered X-ray diffraction pattern and negligible water (H₂O) adsorption capacity resulted. Chemical analysis showed 56% ammonium ion-exchange with 11% cation deficiency.

LZ-200 can, after suitable activation by techniques known in the art, be used as an adsorbent. Table 1 summarizes some typical adsorption properties of sodium LZ-200. The values in Table 1 were determined by standard techniques, using a McBain-Bakr apparatus, after activation at 100° C. for 16 hours under reduced pressure. Sodium LZ-200 adsorbs methanol ($CH_3OH$) only slightly but adsorbs carbon dioxide ($CO_2$) and water ($H_2O$) at levels somewhat less than does potassium zeolite A, indicating it has pore size slightly smaller than that of potassium zeolite A.

TABLE 1
Summary of Adsorption Properties of LZ-200

| Adsorbate | Temperature, °C. | Pressure, torr | Gas Adsorption, cc/g LZ-200 |
|---|---|---|---|
| $O_2$ | −183 | 10–750 | Not adsorbed |
| $O_2$ | 0 | 300–750 | Not absorbed |
| Ne | −196 | 100–750 | Not absorbed |
| $CH_3OH$ | 23 | 80 | 0.015–0.045 |
| $CO_2$ | 23 | 100 | 0.89–0.124 |
|  |  | 750 | 0.155–0.162 |
| $H_2O$ | 23 | 4.6 | 0.174–0.184 |
|  |  | 19.5 | 0.203–0.206 |

DESCRIPTION OF THE PREFERRED EMBODIMENT OF LZ-200

The preferred as-synthesized form of LZ-200 is the sodium form, having a composition in terms of mole-ratios of the oxides on an anhydrous basis of:

$$0.9-1.1\ Na_2O : Al_2O_3 : 1.9-2.4\ SiO_2,$$

and having a characteristic X-ray powder diffraction pattern as shown in Table A.

The following examples illustrate a method of making LZ-200.

EXAMPLE 1

Feed solutions supplying alumina, silica, sodium hydroxide and water were made a day before the synthesis run.

An aluminate feed solution was prepared, by dissolving in water, flake NaOH containing 76.2 wt.% $Na_2O$ and stirring in Alcoa C-131, a commercial hydrated alumina containing 65.0 wt.% $Al_2O_3$. Using a steam coil, the solution was heated at 114° C. for 30 minutes and left to cool overnight to 55° C. in a feed tank until the synthesis run began.

A silicate solution was prepared by adding Grade 40 sodium silicate, a silicate containing 9.0 wt.% $Na_2O$ and 28.6 wt.% $SiO_2$, to water in a feed tank at room temperature and letting it stand until the day of the run. The composition of the aluminate feed solution in terms of weight-percent of oxides was:

20.0 $Al_2O_3$:18.2 $Na_2O$:6.18 $H_2O$.

The composition of the silicate solution in terms of weight-percent of oxides was:

13.4 $SiO_2$:4.64 $Na_2O$:81.2 $H_2O$.

Before the run, a reactor was charged with a hot-mixed gel batch. This batch was prepared by separately heating to 100° C. a portion of the sodium silicate and sodium aluminate feed solutions prepared as described above. The proper amount of sodium silicate solution to give the required gel composition was then mixed into the sodium aluminate solution, using a mixer fitted on the reactor. The mixer was then left on throughout the entire synthesis run as described below.

The resultant gel composition in terms of moles of oxides was:

1.76 $SiO_2$:$Al_2O_3$:2.06 $Na_2O$:56 $H_2O$.

The reactor was a 12-liter stainless-steel flask fitted with reflux condenser. Liquid level in the reactor was maintained by suction through a constant-level tube fitted to maintain a liquid volume in the reactor of 5 liters.

The mixer was 1/10-horsepower with two three-blade marine-type propellers 2 inches in diameter, and operated at speeds ranging from about 3000 to 5000 RPM.

The gel batch in the reactor was mixed for 30 minutes at about 100° C. The feed solutions were then pumped through separate inlets into the reaction. The feed rate of the aluminate feed solution was 76 g/min and the feed rate of the silicate feed solution was 124 g/min. in order to maintain the above-specified gel composition. The reaction temperature was maintained at 100° C. by use of a heating mantle on the reactor vessel and by preheating the solutions. Effluent was withdrawn from the reactor through the suction tube and collected. Samples were periodically taken, filtered and the solids analyzed by standard X-ray powder diffraction techniques.

Analysis of the X-ray powder diffraction patterns of the samples indicated that during the synthesis of LZ-200, transitory phases of aluminosilicate zeolites were produced, and in turn consumed. After a time, however, a zeolite characteristic of LZ-200 began to form at the expense of the other phases, until after about 5.5 hours from the mixing of the initial gel batch, at which time the LZ-200 material predominated. The transitory phases and LZ-200 materials were identified by peaks on the X-ray diffraction pattern which correspond to characteristic d-spacings of the particular crystalline aluminosilicate. The LZ-200 product was characterized by its X-ray powder diffraction pattern containing at least those d-spacings set forth in Table A. The transitory phases detected during synthesis of LZ-200 were sodium zeolite A, hydroxysodalite and cancrinite. Tables showing the characteristic lines of zeolite A are shown in the hereinbefore-referenced U.S. Pat. No. 2,882,243 to R. M. Milton. Lines of an X-ray diffraction pattern for a sample of hydroxysodalite are shown in Table 4.53 on page 360 of *Zeolite Molecular Sieves*, by D. W. Breck, published by John Wiley and Sons (1974). X-ray diffraction analysis of samples containing hydroxysodalite will show substantially the same lines shown in the above-referenced table. Lines of an X-ray diffraction pattern for a sample of cancrinite, an aluminosilicate of the feldspathoid family, are shown on A.S.T.M. Card No. 25-776, published by the Joint Committee on Powder Diffraction Standards, A.S.T.M, (1975). X-ray diffraction analysis of samples containing cancrinite will show substantially the same lines shown in the table of that A.S.T.M. card.

Chemical analysis of a sample of the LZ-200 product indicated the following composition on an anhydrous basis in terms of mole-ratios of oxides as follows:

1.02 $Na_2O$:1.0 $Al_2O_3$:1.96 $SiO_2$.

EXAMPLE 2

Feed solutions of sodium aluminate and sodium silicate were prepared essentially as in Example 1. A hot-mixed gel batch was prepared in the reactor such that the resultant overall composition in mole-ratios of oxides was about:

1.8 $SiO_2$:1.0 $Al_2O_3$:2.1 $Na_2O$:56 $H_2O$.

This gel batch was digested overnight under reflux conditions with high-speed agitation. As in Example 1, the feed solutions of sodium aluminate, at 100° C., and sodium silicate, at room temperature, were then separately pumped through heat-exchangers and into the reactor. Reaction temperature was 98°-101° C. After about 5.5 hours from the introduction of the feed streams it was observed that the LZ-200 species predominated. The total length of the run was 10 hours.

The final sample of LZ-200 product taken at the conclusion of the run showed, by X-ray diffraction analysis, a small amount of Type A but no hydroxysodalite. However, the LZ-200 product obtained at the end of 9.5 hours contained no significant traces of either Type A or hydroxysodalite, and was characterized by the X-ray pattern shown in Table 2.

Chemical analysis of a sample of the LZ-200 product indicated the following composition on an anhydrous basis in terms of mole-ratios of oxides as follows:

1.06 $Na_2O$:1.0 $Al_2O_3$:2.00 $SiO_2$.

TABLE 2

| Interplanar spacings, d, Å | Relative Intensity, 100 $I/I_o$ |
| --- | --- |
| 12.11 | 100 |
| 6.97 | 23 |
| 5.64 | 6 |
| 5.13 | 6 |
| 4.77 | 20 |
| 4.60 | 31 |
| 4.44 | 17 |
| 4.12 | 5 |
| 3.74 | 7 |

TABLE 2-continued

| Interplanar spacings, d, Å | Relative Intensity, 100 $I/I_0$ |
| --- | --- |
| 3.49 | 26 |
| 3.29 | 10 |
| 3.16 | 10 |
| 3.03 | 59 |
| 2.89 | 24 |
| 2.81 | 21 |
| 2.75 | 7 |
| 2.64 | 18 |

What is claimed is:

1. A synthetic crystalline zeolite having, on an anhydrous basis, a composition expressed in terms of mole-ratios of oxides as follows;

$$0.9\text{--}1.1\ M_{2/n}O:Al_2O_3:1.9\text{--}2.4\ SiO_2,$$

where M is a cation selected from the group including alkali, alkaline earth and transition metals, ammonium and hydrogen, and n is the valence of M, said crystalline zeolite having an X-ray powder diffraction pattern containing at least those d-spacings set forth in Table A.

2. A composition according to claim 1 where M represents the sodium cation.

* * * * *

UNITED STATES PATENT AND TRADEMARK OFFICE
CERTIFICATE OF CORRECTION

PATENT NO. : 4,348,369

DATED : September 7, 1982

INVENTOR(S) : Richard J. Hinchey, et al.

It is certified that error appears in the above—identified patent and that said Letters Patent is hereby corrected as shown below:

Col. 3, line 15, "6.18" should read --61.8--

Signed and Sealed this

Twenty-third Day of November 1982

[SEAL]

Attest:

Attesting Officer

GERALD J. MOSSINGHOFF

Commissioner of Patents and Trademarks